US008945374B2

(12) United States Patent
Chase

(10) Patent No.: US 8,945,374 B2
(45) Date of Patent: Feb. 3, 2015

(54) BEVERAGE DISPENSING SYSTEM WITH AUTOMATED WATER FILTER RECOMMENDATION

(75) Inventor: Kevin M. Chase, Saint Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 361 days.

(21) Appl. No.: 12/915,165

(22) Filed: Oct. 29, 2010

(65) Prior Publication Data
US 2012/0107453 A1    May 3, 2012

(51) Int. Cl.
| B01J 49/00 | (2006.01) |
| B01D 15/00 | (2006.01) |
| G06F 19/00 | (2011.01) |
| F25D 23/12 | (2006.01) |

(52) U.S. Cl.
CPC ........ *F25D 23/126* (2013.01); *F25D 2323/121* (2013.01)
USPC ....... 210/96.1; 210/639; 210/435; 210/198.1; 210/141; 702/25; 222/189.06

(58) Field of Classification Search
USPC ........ 210/96.1, 634, 639, 644, 649, 660, 739, 210/767, 85, 109, 141, 198.1, 149, 205, 210/282, 321.72, 435; 702/188, 25, 50; 222/189.06, 25, 40, 52
See application file for complete search history.

(56) References Cited

U.S. PATENT DOCUMENTS

| 6,753,186 | B2 | 6/2004 | Moskoff |
| 6,759,072 | B1 | 7/2004 | Gutwein et al. |
| 7,378,015 | B2 | 5/2008 | Rinker et al. |
| 7,424,399 | B2 | 9/2008 | Kahn et al. |
| 2002/0040505 | A1 | 4/2002 | Tanaka et al. |
| 2005/0050647 | A1 | 3/2005 | Tanaka et al. |
| 2005/0133420 | A1 | 6/2005 | Rinker et al. |
| 2005/0133427 | A1* | 6/2005 | Rinker et al. .................. 210/209 |
| 2006/0016347 | A1* | 1/2006 | Girard et al. ..................... 99/295 |
| 2006/0060512 | A1* | 3/2006 | Astle et al. ....................... 210/85 |
| 2006/0144765 | A1 | 7/2006 | Skwiot |
| 2007/0050157 | A1* | 3/2007 | Kahn et al. ...................... 702/55 |
| 2008/0289402 | A1 | 11/2008 | Chowdhury |
| 2009/0044129 | A1 | 2/2009 | Ebrom et al. |
| 2009/0044137 | A1 | 2/2009 | Bartley et al. |
| 2009/0045926 | A1 | 2/2009 | Ebrom et al. |
| 2009/0046715 | A1 | 2/2009 | McCoy |

* cited by examiner

*Primary Examiner* — Nam Nguyen
*Assistant Examiner* — Richard Gurtowski

(57) ABSTRACT

A device and mechanism for recommending a water filter in a beverage dispenser is described. A sensor senses qualities of unfiltered water. Another sensor senses qualities of a flavorant container, such as the flavorant contained within the container. Based on the quality of the unfiltered water and the particular flavored beverage desired, the device will recommend a water filter to optimize the flavor of the beverage.

14 Claims, 4 Drawing Sheets

BEVERAGE DISPENSING SYSTEM WITH AUTOMATED WATER FILTER RECOMMENDATION

FIELD OF THE INVENTION

The present invention relates generally to appliances that include beverage dispensers, and more particularly to appliances that use water filters as part of a beverage dispensing system.

BACKGROUND OF THE INVENTION

In-home dispensers for flavored beverages have become popular in recent years. Many of these dispensers include pods or cartridges that contain a powder, concentrate, or grounds that mix with water to create a flavored beverage. These may be hot beverages such as coffee, tea or hot cocoa, or may be cold beverages such as iced tea, lemonade, or other flavored beverages. It is known to include a water filter in order to condition the water before it is mixed with the flavorant. However, the flavor of different beverages may be optimized by water having different qualities. For example, some beverages have better flavor when made with relatively hard water as opposed to relatively soft water, and vice versa.

Different types of water filters remove different elements from incoming water. Therefore, the selection of a water filter to include in a beverage dispensing system can have a significant effect on the flavor of the final beverage after it is mixed with the filtered water. Presently consumers are left to either a single filter that fits the system, or trial and error in determining what filter is best for optimizing their beverages.

BRIEF SUMMARY OF THE INVENTION

It is an object of the present invention to provide an appliance that includes a beverage dispensing system wherein the beverage dispensing system recommends a type of water filter based on a sensed quality of unfiltered water.

It is an object of the present invention to provide an appliance that includes a beverage dispensing system wherein the beverage dispensing system recommends a type of water filter based on a sensed quality of a flavorant container.

It is another object of the present invention to provide a method of recommending a water filter type for use on an appliance with a beverage dispensing apparatus.

It is a further object of the present invention to provide a beverage dispenser that recommends a water filter to optimize the flavor of a dispensed beverage taking into consideration the flavor of the specific beverage and the qualities of the incoming unfiltered water.

According to one embodiment, the present invention is directed to a beverage dispensing apparatus that has a water inlet adapted for connection to a source of unfiltered water. A water pathway leads from the water inlet to a dispensing outlet. A water filter is in operable connection to the water pathway between the inlet and the dispensing outlet. The water filter having an inlet that receives unfiltered water and an outlet that directs filtered water into the water pathway upstream from the dispensing outlet. A water quality sensor is provided in the water pathway upstream from the water filter that detects a quality of the unfiltered water. A water filter indicator display displays an indication of a recommended water filter that is based on a detected quality of the unfiltered water. A flavorant container containing flavorant may be provided that has an outlet in communication with the filtered water. A flavorant container sensor may be provided that detects a quality of the flavorant container, and the recommended water filter may be based in part on the detected quality of the flavorant container. The detected quality of the flavorant container may be a marking that indicates a flavor of the flavorant. The flavorant container sensor may be a bar code reader. The beverage dispensing apparatus may also include a microprocessor in operable communication with the water quality sensor and the display, wherein the microprocessor is adapted to receive a signal from the water quality sensor indicating the detected water quality. The microprocessor may be programmed to determine the recommended water filter based on the detected water quality. The microprocessor may be adapted to send a signal to the water quality indicator corresponding to the recommended water filter.

According to another embodiment, the present invention is directed to an appliance that includes a flavored beverage dispenser. According to this embodiment, an appliance body includes a beverage dispensing area. A supply of unfiltered water is available within the appliance body. A water quality sensor is in operable association with the unfiltered water. The water quality sensor is adapted to sense a quality of the unfiltered water. A water filter has an inlet in communication with the unfiltered water and an outlet in communication with the beverage dispensing area. A flavorant dispenser includes a flavorant container and a dispensing actuator. The flavorant dispenser has an outlet in communication with the beverage dispensing area. A flavorant container sensor is in operable association with the flavorant dispenser to sense a quality of the flavorant container. A microprocessor is adapted to receive a signal from the water quality sensor indicating the sensed quality of the unfiltered water. The microprocessor is also adapted to receive a signal from the flavorant container sensor indicating the sensed quality of the flavorant container. The microprocessor is programmed to determine a recommended water filter based on the sensed quality of the unfiltered water and the sensed quality of the flavorant container. The microprocessor is adapted to send a signal to a water filter indicator display to cause the indicator display to display an indication of the recommended water filter. The detected quality of the flavorant container may be a marking on the container that indicates a flavor of the flavorant. The flavorant container sensor may be a bar code reader. Alternatively, the flavorant container sensor may be adapted to sense a shape of a portion of the flavorant container. The detected quality of the unfiltered water may be water hardness. Alternatively, the detected quality of the unfiltered water may be a level of an impurity.

According to another embodiment, the present invention is directed to a method of recommending a water filter type for use on the appliance that has a beverage dispenser. According to this method, unfiltered water is received at an inlet. A quality of the unfiltered water is sensed. A recommended water filter type is determined based on the sensed quality of the unfiltered water. The recommended water filter type is visually communicated. The method may also include connecting a flavorant container to the beverage dispenser, sensing a quality of the flavorant container, and basing the determination of the recommended water filter type in part on the sensed quality of the flavorant container.

According to yet another embodiment, the present invention is directed to a method of recommending a water filter type for use on an appliance with a beverage dispenser. According to this method, unfiltered water is received at an inlet. A flavorant container is connected to the beverage dispenser. A quality of the flavorant container is sensed. A recommended water filter type is determined based on the sensed quality of the flavorant container. The recommended water filter type is visually communicated. The sensed quality of the flavorant container may be an indicator of a flavor of the flavorant.

According to one embodiment, the present invention is directed to an appliance with a beverage dispenser. The beverage dispenser includes a sensor for sensing a quality of a flavorant container. The appliance is connected to a supply of water. A sensor is adapted to test the supply of water for impurities. A microcontroller receives signals from the container sensor and the water sensor. The microcontroller provides an output to a display that displays a recommended type of water filter. A flavoring cartridge is connected to the appliance and a flavorant type of the flavoring cartridge is sensed. A recommended water filter type is communicated based on the water quality and flavorant type.

DETAILED DESCRIPTION OF PREFERRED EMBODIMENTS

Figure 1:
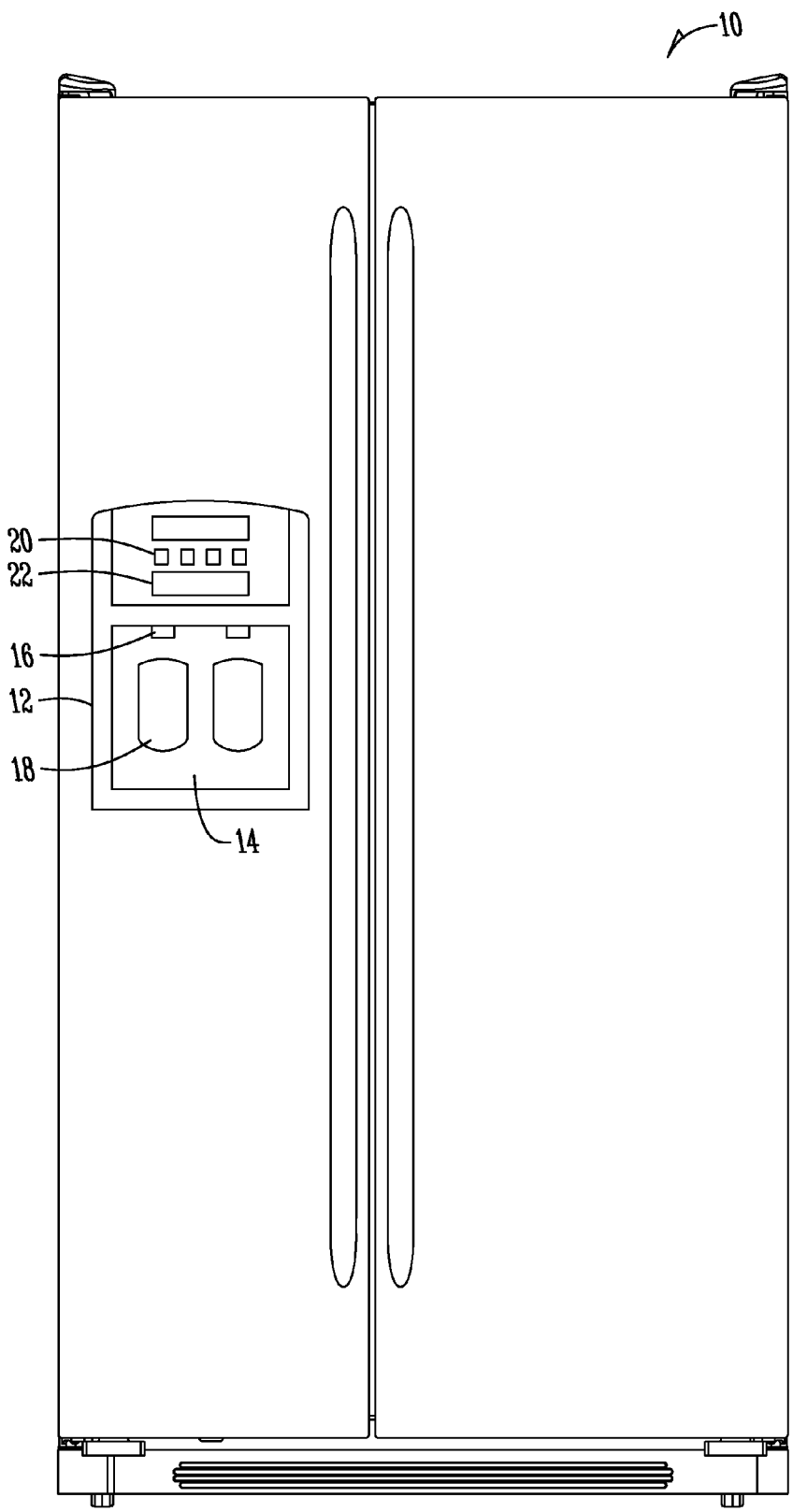
FIG. 1 is a front elevation view of an appliance including a beverage dispenser according to one embodiment of the present invention.

FIG. 1 shows an appliance 10 that includes a beverage dispensing unit 12. The dispensing unit 12 includes a dispensing area 14 for selectively dispensing a beverage into a container (not shown). The dispensing unit 12 includes an outlet 16 from which a beverage may be dispensed into the dispensing area 14. An activation paddle 18 is provided which may be pressed by a container in order to initiate a dispensing cycle. The paddle 18 may be connected with a pressure sensitive switch or a contact switch, or may be another known mechanism for initiating dispensing. Alternatively other actuation mechanisms, such as a push button, may be utilized. The dispensing unit 12 may also include controls 20 which may be used to control various dispensing functions. The controls 20 may be buttons, or other input mechanisms. A display device 22 is provided on the dispensing unit 12 for communicating information about the status of the dispensing unit 12. The beverage dispensing unit 12 may also include ice dispensing or other additional features. In the embodiment shown, the appliance 10 is a consumer refrigerator. However a dispensing unit 12 according to the present invention may be included in other appliances, such as a stand alone coffee maker, tea maker, or stand alone cold beverage dispenser.

Figure 2:
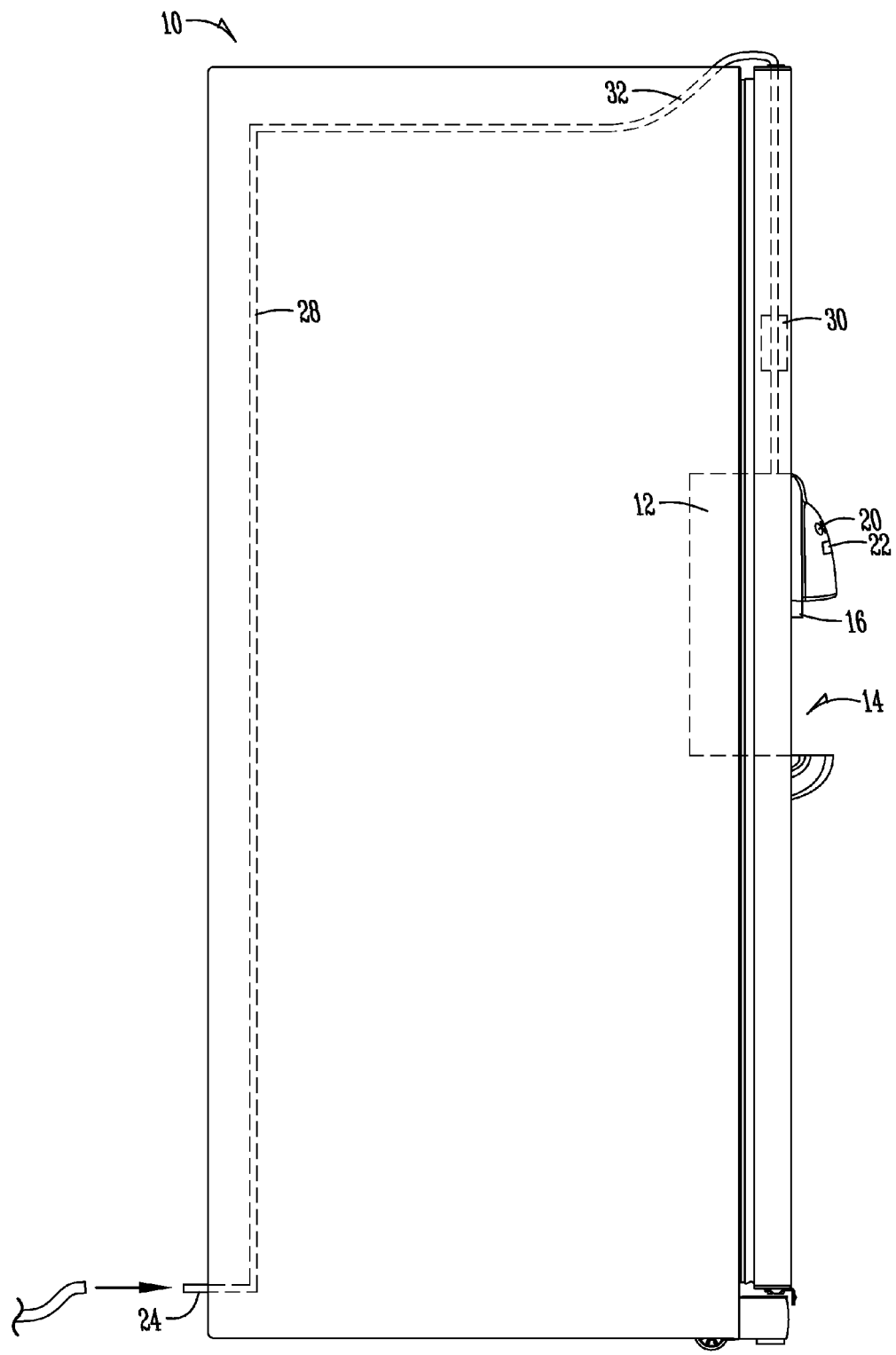
FIG. 2 is a side elevation view of the appliance of FIG. 1 with an indication of the location of the water flow pathway according to one embodiment of the present invention.

FIG. 2 shows a side elevation view of the appliance 10 from FIG. 1 with broken lines indicating a water pathway through the appliance 10. As can be seen, the appliance 10 includes an inlet connection 24 that can be attached to an outside supply of water 26. Typically the supply of water 26 will be tap water from residential plumbing. After entering the appliance 12 through the inlet connection 24, water will flow through unfiltered water conduit 28 to a replaceable water filter 30. After being filtered through the water filter 30, the water will then flow through filtered water conduit 32 to the beverage dispensing unit 12. The water filter 30 may be located in a variety of locations, including before or after any water reservoir within the appliance 10, and including within the beverage dispensing unit 12.

Figure 3:
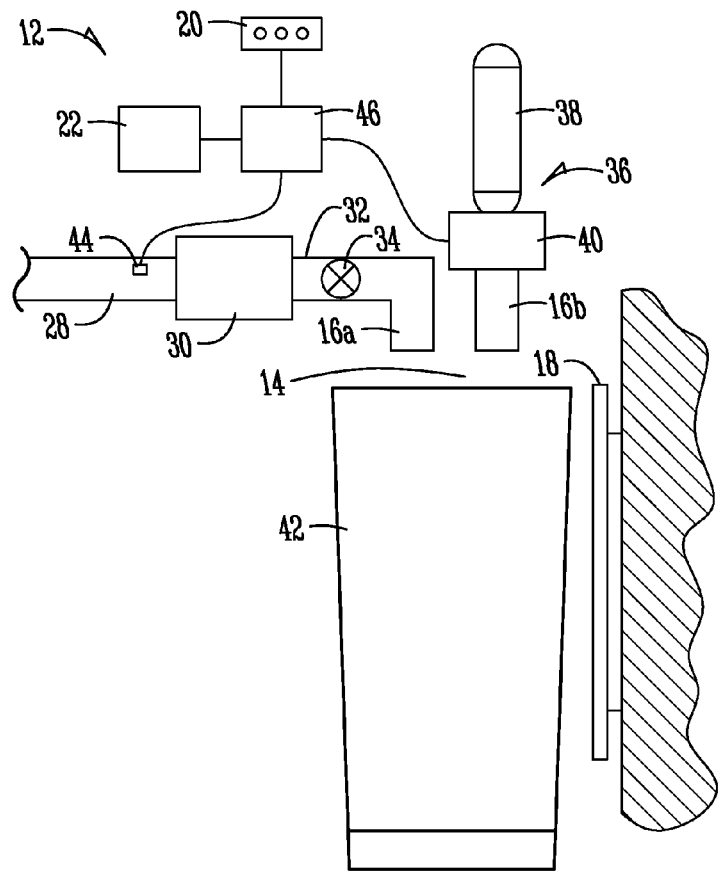
FIG. 3 is a schematic representation of a beverage dispensing apparatus according to one embodiment of the present invention.

FIG. 3 shows a beverage dispensing unit 12 according to one embodiment of the present invention. Unfiltered water enters the dispensing unit 12 through conduit 28. Typically the water will be from a pressurized source, such as residential tap water. However, the appliance may include a pump in order to pressurize the water if needed. Before flowing to outlet 16A, the water must pass through water filter 30. The water filter 30 should be a replaceable filter. The filter 30 is graphically illustrated in FIG. 3 as an inline filter; however, in practice the inlet and outlet of the filter 30 would likely be located at the same end of the water filter 30 for ease of connection and removal from the water lines 28 and 32. A control valve 34 controls flow of water to the outlet 16A. When control valve 34 is closed there is no flow, and when the control valve 34 is opened water flows out of the outlet 16A to be dispensed. A flavorant dispenser 36 includes a flavorant container 38, a flavorant dispensing actuator 40, and an outlet 16B. In the embodiment of FIG. 12 both the water outlet 16A and the flavorant outlet 16B dispense directly into the dispensing area 14 such that they are mixed within a container 42 as they are dispensed. As an alternative, the two outlets 16A and 16B may join together before they terminate in the dispensing area 14, such that the water and flavorant come out a single outlet mixed together as the desired beverage (see for example, FIG. 4).

A water quality sensor 44 is provided upstream from the filter 30 to detect various qualities of the unfiltered water. For example, the system may detect hardness, arsenic, total organic carbon (TOC), and other impurities. The sensor 44 is adapted to send a signal to a microprocessor 46. The signal will include data representing the quality of the water sensed by the water quality sensor 44.

The microprocessor 46 may be a single integrated circuit, or may be a collection of integrated circuits. The microprocessor 46 may be any central processing system that can be programmed with logic and data to control the various elements of the present invention. The microprocessor 46 is programmed with logic and data that permit it to recommend a particular water filter, or type of water filter, depending upon the quality of the water sensed by the water quality sensor 44. The microprocessor 46 is adapted to send a signal to control display device 22 to display a visual indication of the water filter recommendation generated by the microprocessor 46. The display device 22 may be a video screen, an LCD screen, an LED array, or any other visual display suitable for communicating a recommendation of water filter or water filter type.

Depending on the recommendation of the microprocessor 46, a user may replace the current water filter 30 with a different style or model of water filter in order to optimize the flavor of the water, or a beverage made from a mixture of the water and the flavorant within the flavorant container 38. Controls 20 may be used to provide input into the system in order to control the dispensing function. For example, the controls 20 may include a selection that causes the dispensing unit 12 to dispense water only with no flavorant added. The controls 20 may include an input to permit a user to select that the dispensing unit will dispense a mixture of the flavorant within container 38 along with water. The controls 20 may include a selection that varies the ratio or concentration of the flavorant that is mixed with the water in order to customize the strength of the beverage. Other options will be apparent to those skilled in the art.

The flavorant container 38 may be a single serving container, such that all of the flavorant within the container is utilized for a single serving beverage. Alternatively, the flavorant container 38 may contain enough flavorant to flavor several servings of beverages. The container 38 may be refillable, or may be disposable. According to one embodiment the container 38 may include a built-in pump mechanism that is driven by the actuator 40. Such a system is shown and described in Greenwald, U.S. Pat. No. 7,578,419; Girard, U.S. Patent Publication No. 2006/0000851; and Girard, U.S. Patent Publication No. 2008/0173705; all of which are hereby incorporated by reference in their entireties.

Accordingly, FIG. 3 shows a beverage dispensing unit 12 that can optimize the flavor of a dispensed beverage by recommending an optimal water filter based on the quality of the water supply. It should be appreciated that the filter recommending features of the beverage dispensing unit 12 of FIG. 3 could be used advantageously even if the flavorant dispenser 36 was not included. It should also be appreciated that in the case of a coffee or tea dispenser, the water might be routed to flow through the container 38 in order to be flavored by the coffee grounds or tea leaves, rather than mixing with the flavorant outside of the container 38 as shown. The beverage dispensing unit 12 of FIG. 3 is best suited for use in appliances that will dispense a single flavor, or only similar flavored beverages. However, its use is not so limited, and it would also be useful in dispenses that can accept a variety of flavors within the flavorant container 38, such that several different flavored beverages can be dispensed.

Figure 4:
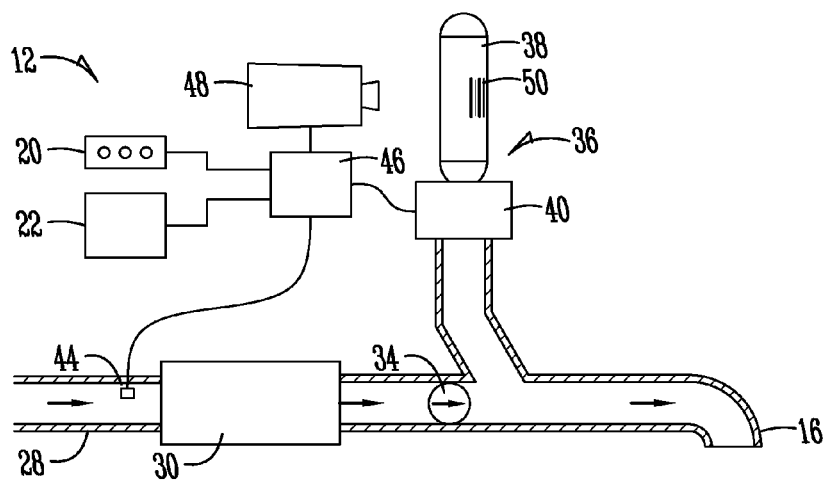
FIG. 4 is a schematic representation of an embodiment of a beverage dispensing apparatus according to another embodiment of the present invention.

FIG. 4 shows a dispensing unit 12 according to another embodiment of the present invention. The dispensing unit 12 of FIG. 4 is adapted to recommend a water filter based on both sensed qualities of the incoming water and the flavor of a specific beverage that a consumer has selected. Unfiltered water is supplied to the dispensing unit 12 through conduit 28. Typically the water will be tap water. A water quality sensor 44 is used to sense the water upstream from water filter 30. The water quality sensor 44 communicates with a microprocessor 46 to provide data to the microprocessor 46 regarding the sensed qualities of the unfiltered water.

A flavorant dispenser assembly 36 is provided downstream from the water filter 30 to add a flavorant to the filtered water to create a flavored beverage. The flavorant dispenser assembly 36 includes a flavorant container 38 that contains flavorant, such as a liquid concentrate, flavored dissolvable powder, or other flavoring. An actuator 40 is associated with the flavorant container 38 in order to inject, or otherwise mix the flavorant with the water. The actuator 40 may be connected with the microprocessor 46 to permit a user to control the actuator 40. A flavorant container sensor 48 is provided to sense a feature or features of the flavorant container 38. According to one embodiment, the flavorant container sensor 48 is a bar code scanner. According to another embodiment, the flavorant container sensor 48 is an electrical resistance sensor that senses variations in electrical resistance on resister markers placed on the flavorant container 38. Alternatively, the flavorant container sensor 48 could be an optical recognition system that recognizes specific markers placed on the flavorant container 38.

The flavorant container 38 may be marked with a flavor quality indicator 50. The flavor quality indicator 50 may include an indication of qualities of the flavorant. For example the quality indicator 50 may indicate the specific flavor within the container 38, the concentration of the flavorant, or manufacturer recommendations related to the flavorant, for example a preferred water filter type or preferred mixing ratio. The flavorant container sensor 48 may be in communication to send a data signal to the microprocessor 46. Depending upon the type of sensor 48, the indicator 50 may be, among other things, a bar code, a 2-D bar code, an electrical resistor, or an optical character.

The microprocessor 46 is programmable so that various flavors or flavorant types can be associated with desired water quality. The microprocessor 46 may be programmed to recommend a type of water filter based solely on water quality sensed by the water quality sensor 44, based solely on information sensed by the flavorant container sensor 48, or based on a combination of the sensed water quality and sensed flavorant quality. The microprocessor 46 can control the display device 22 to display water filter recommendation information to a user.

Figures 5, 6:
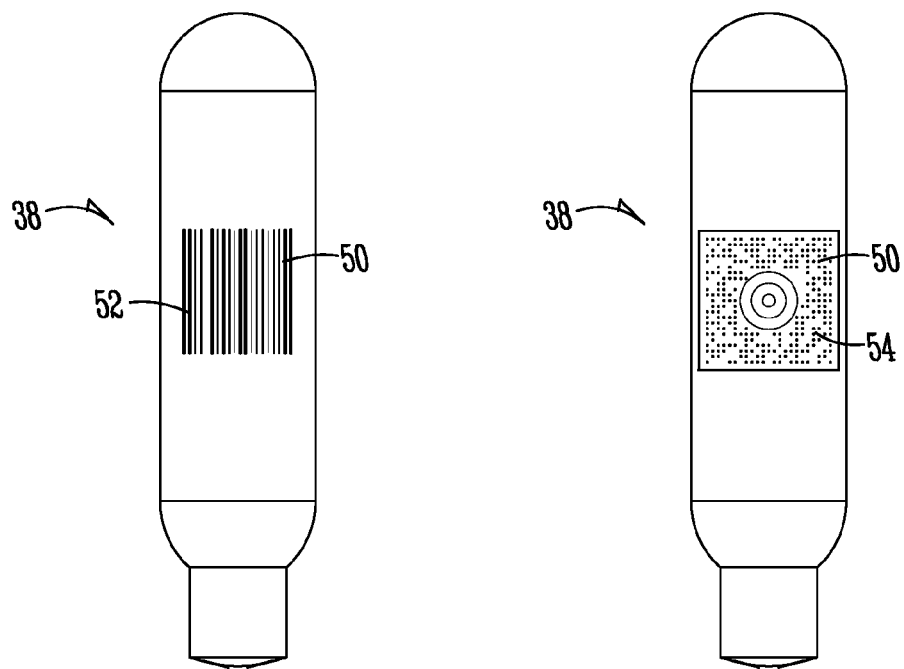
FIG. 5 is a front elevation view of a flavorant container with a barcode according to one embodiment of the present invention.
FIG. 6 is a front elevation view of a flavorant container with a 2-D optic identifier according to one embodiment of the present invention.
Figure 7:
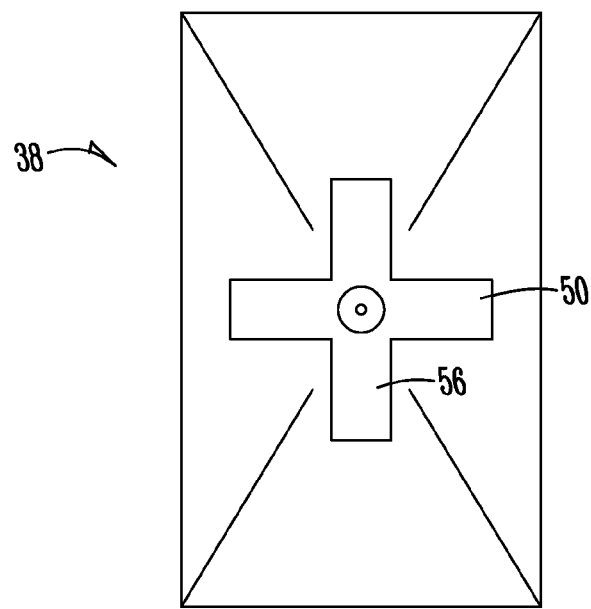
FIG. 7 is a bottom plan view of a flavorant cartridge with a key-shaped spout to indicate flavorant quality according to one embodiment of the present invention.

FIGS. 5, 6 and 7 show different embodiments of flavorant containers 38 that include different styles of quality indicators 50. In FIG. 5, the flavorant container 38 is marked with a standard UPC bar code 52. The flavorant container 38 of FIG. 6 is marked with a so-called 2-D bar code. FIG. 7 is a bottom plan view of a flavorant container 38 that utilizes a uniquely shaped outlet spout 56 as a quality indicator 50. According to the embodiment of FIG. 7, the outlet spout 56 acts as a key. Depending on the shape of the spout 56, a pre-programmed sensor that receives the container 42, which would likely be incorporated with the actuator 40, will sense the shape of the spout 56 and relate that shape to one of several predefined qualities for the flavorant. For example, strawberry flavor may be associated with the cross shape that includes four projections shown in FIG. 7; whereas, a cherry flavor may be associated with a similar spout that includes only three such projections.

In use, when a user inserts a new flavorant container 38, the flavorant container sensor 48 will sense the quality indicator 50. This information will be communicated to the microprocessor 46. The incoming water quality flow will also be sensed by water quality sensor 44 and that information will be relayed to the microprocessor 46 as well. Logic programmed into the microprocessor 46 will then recommend a water filter that will optimize or enhance the flavor of a beverage made using filtered water and the flavorant within flavorant container 38.

The invention has been shown and described above with reference to the preferred embodiments. It is understood that many modifications, substitutions, and additions may be made that are within the intended scope and spirit of the invention. The invention is only limited by the claims that follow.

What is claimed is:

1. A beverage dispensing apparatus comprising:
   a water inlet adapted for connection to a source of unfiltered water;
   a water pathway from the water inlet to a dispensing outlet at or near a beverage dispensing area;
   a replaceable water filter in operable connection to the water pathway between the inlet and the dispensing outlet, the water filter having an inlet that receives unfiltered water and an outlet that directs filtered water into the water pathway upstream from the dispensing outlet, the water filter configured according to a first type of plural types of filtering characteristics related to removing one or more impurities from the unfiltered water to produce the filtered water for a beverage dispensed from the beverage dispensing apparatus, the beverage comprising the filtered water and a flavorant;

a water quality sensor in the water pathway upstream from the water filter that detects a quality of the unfiltered water;

a processor including programming with logic and data adapted to make a determination of a recommended type of water filter to optimize a flavor of the beverage made using the filtered water and the flavorant, wherein the determination is made using at least one input to the processor comprising a signal including data related to a quality sensed by the water quality sensor and a flavorant type of the flavorant, wherein the recommended type of water filter may be different than the first type by its filtering characteristics:

a water filter indicator display device that visually indicates an indication of the recommended type of water filter based on a signal from an output of the processor; and a flavorant dispenser for dispensing the flavorant for mixing with the filtered water to produce the beverage, the flavorant dispenser comprising a flavorant container containing the flavorant, an outlet from which flavorant from the flavorant container is dispensed, and a flavorant dispensing actuator controlled by a signal from an output of the processor;

so that various flavorant or flavorant an be associated with a desired water quality for optimizing or enhancing dispensed beverages.

2. The beverage dispensing apparatus of claim 1, further comprising a flavorant container sensor that detects a quality of the flavorant container, the recommended type of water filter being based in part on the detected quality of the flavorant container.

3. The beverage dispensing apparatus of claim 2, wherein the detected quality of the flavorant container is a marking on the container that indicates a flavor of the flavorant.

4. The beverage dispensing apparatus of claim 3, wherein the flavorant container sensor is a bar code reader.

5. The beverage dispensing apparatus of claim 2, wherein the flavorant container sensor senses a shape of a portion of the flavorant container.

6. The beverage dispensing apparatus of claim 1 wherein the processor is in operable communication with the water quality sensor and the display, the processor is adapted to receive a signal from the water quality sensor indicating the detected quality, the processor is programmed to determine the recommended type of water filter based on the detected quality, and the processor is adapted to send a signal to the display device corresponding to the recommended type of water filter, the display device comprising a video screen, LCD screen, or LED array.

7. The beverage dispensing apparatus of claim 1, wherein the detected quality of the unfiltered water is water hardness.

8. The beverage dispensing apparatus of claim 1, wherein the detected quality of the unfiltered water is a level of an impurity.

9. An appliance including a flavored beverage dispenser, the appliance comprising:

an appliance body including a beverage dispensing area;

a supply of unfiltered water within the appliance body;

a water quality sensor in operable association with the unfiltered water, the water quality sensor adapted to sense a quality of the unfiltered water;

a water filter that includes an inlet in communication with the unfiltered water and an o in communication with the beverage dispensing area;

a flavorant dispenser including a flavorant container and a dispensing actuator, the flavorant dispenser having an outlet in communication with the beverage dispensing area;

a flavorant container sensor in operable association with the flavorant dispenser that senses a quality of the flavorant container;

a water filter indicator display; and a microprocessor adapted to receive a signal from the water quality sensor indicating the sensed quality of the unfiltered water, the microprocessor also being adapted to receive a signal from the flavorant container sensor indicating the sensed quality of the flavorant container, the microprocessor being programmed to determine a recommended type of water filter from a set of types based on the sensed quality of the unfiltered water and the sensed quality of the flavorant container to optimize a flavor of a beverage made using water filtered by the water filter and flavorant dispensed from the flavorant container, the microprocessor adapted to send a signal to the water filter indicator display to cause the indicator display to display an indication of the recommended type of water filter.

10. The beverage dispenser of claim 9, wherein the detected quality of the flavorant container is a marking on the container that indicates a flavor of the flavorant.

11. The beverage dispenser of claim 10, wherein the flavorant container sensor is a bar code reader.

12. The beverage dispenser of claim 9, wherein the flavorant container sensor is adapted to sense a shape of a portion of the flavorant container.

13. The beverage dispenser of claim 9, wherein the detected quality of the unfiltered water is water hardness.

14. The beverage dispenser of claim 9, wherein the detected quality of the unfiltered water is a level of an impurity.

* * * * *